United States Patent

Martin

[11] Patent Number: 5,174,715
[45] Date of Patent: Dec. 29, 1992

[54] TURBINE NOZZLE

[75] Inventor: Jack R. Martin, Bedford, Mass.

[73] Assignee: General Electric Company, Cincinnati, Ohio

[21] Appl. No.: 785,677

[22] Filed: Oct. 31, 1991

Related U.S. Application Data

[62] Division of Ser. No. 627,161, Dec. 13, 1990.

[51] Int. Cl.$^5$ .............................................. F01D 1/02
[52] U.S. Cl. ........................... 415/209.4; 415/210.1; 29/464; 29/889.21; 29/889.22
[58] Field of Search .......... 29/889.21, 889.22, 889.23, 29/406, 464, 527.3; 415/191, 208.5, 183, 185, 181, 209.3, 209.4, 210.1; 416/241; 269/909, 40, 289 MR, 296

[56] References Cited

U.S. PATENT DOCUMENTS

| | | | |
|---|---|---|---|
| 1,932,264 | 10/1933 | Dickinson | 415/209.4 |
| 2,475,772 | 7/1949 | Allen et al. | 269/40 X |
| 2,821,778 | 2/1958 | Wilken | 269/40 |
| 3,519,366 | 7/1970 | Campbell | 415/209.3 X |
| 3,836,282 | 9/1974 | Mandelbaum et al. | 415/209.4 |
| 3,849,023 | 11/1974 | Klompas | 415/209.4 X |
| 4,128,929 | 12/1978 | DeMusis | 29/156.8 B |
| 4,501,095 | 2/1985 | Drinkuth et al. | 29/889.21 X |
| 4,589,175 | 5/1986 | Arrigoni | 29/156.8 B |
| 4,601,110 | 7/1986 | Donaldson | 33/547 |
| 4,726,101 | 2/1988 | Draghi et al. | 29/156.8 B |
| 4,735,451 | 4/1988 | Wojciechowski et al. | 294/103.1 |
| 4,798,520 | 1/1989 | Partington et al. | 29/889.21 X |
| 4,829,720 | 5/1989 | Cavalieri | 51/217 R |
| 4,884,951 | 12/1989 | Meylan et al. | 416/191 |
| 4,896,408 | 1/1990 | Fraser | 29/156.8 B |
| 5,001,830 | 3/1991 | Partington et al. | 29/889.21 |
| 5,022,818 | 6/1991 | Scalzo | 415/209.3 |

Primary Examiner—Edward K. Look
Assistant Examiner—Todd Mattingly
Attorney, Agent, or Firm—Jerome C. Squillaro; Nathan D. Herkamp

[57] ABSTRACT

A method of manufacturing a turbine nozzle for obtaining a predetermined value of throat area between adjacent ones of nozzle vanes is disclosed. The method includes providing a first vane, providing a datum for locating the first vane relative to an adjacent vane in the turbine nozzle, and fixturing the first vane relative to the datum for providing a trailing edge nest having six supports for predeterminedly locating the first vane relative to the adjacent vane. The trailing edge nest includes four trailing edge supports for locating the vane trailing edge to define a hinge axis extending along the trailing edge about which the vane is rotatable. A radial support radially locates the vane, and a throat support predeterminedly locates the vane about the hinge axis for obtaining the predetermined value of the throat area.

10 Claims, 7 Drawing Sheets

TURBINE NOZZLE

The U.S. Government has rights in this invention pursuant to Contract No. F33657-82-C-2188 awarded by the Department of the Air Force.

This is a division of application Ser. No. 627,161, filed Dec. 13, 1990.

TECHNICAL FIELD

The present invention relates generally to gas turbine engines, and, more specifically, to a method of manufacturing a gas turbine engine turbine nozzle for obtaining a predetermined value of throat area between adjacent ones of turbine vanes thereof.

BACKGROUND ART

A conventional gas turbine engine includes in serial flow communication a compressor, a combustor, and a turbine. The compressor provides compressed airflow to the combustor wherein it is mixed with fuel and ignited for generating combustion gases which then flow to the turbine which extracts energy therefrom for powering the compressor.

The turbine includes one or more stages with each stage having an annular turbine nozzle for channeling the combustion gases to a plurality of rotor blades. The turbine nozzle includes a plurality of circumferentially spaced stator vanes fixedly joined at their roots and tips to annular, radially inner and outer bands.

Each of the nozzle vanes has an airfoil cross section with a leading edge, a trailing edge, and pressure and suction sides extending therebetween. In one type of turbine nozzle, the trailing edge of one vane is spaced from the suction side of an adjacent vane between its leading and trailing edges to define a throat having a minimum flow area for the combustion gases channeled between adjacent vanes. Adjacent ones of the vanes define individual throat areas and collectively they define a total throat area. These areas are specified by each particular engine design and are critical factors affecting performance and stall margin of the gas turbine engine.

Furthermore, the total throat area is preferably obtained by providing substantially uniform individual throat areas between the adjacent vanes. Variations in throat area between adjacent vanes can provide undesirable aero-mechanical excitation pressure forces which may lead to undesirable vibration of the rotor blades disposed downstream from the nozzle.

There exist numerous methods for manufacturing gas turbine engine turbine nozzles which provide varying degrees of accuracy of the individual and total throat areas. For example, one method utilizes individual vanes having integral inner and outer band segments which are joined together for forming arcuate nozzle segments. A second method utilizes arcuate inner and outer band segments each having a plurality of circumferentially spaced apertures for receiving the roots and tips of the nozzle vanes which are then joined thereto by tack welding and brazing. A third method utilizes individual vanes which are fixed relative to each other and then inner and outer band segments are cast over the roots and tips thereof for forming arcuate nozzle segments. The separate arcuate nozzle segments in these three exemplary methods include two or more vanes, with the segments being conventionally joined together for forming a complete 360° annular turbine nozzle.

In all of these methods of manufacturing the turbine nozzle, each of the individual vanes and inner and outer band segments is separately manufactured and, therefore, subject to inherent manufacturing tolerances. The tolerances are additive and, therefore, stack-up during assembly of the turbine nozzle which adversely affects the ability to achieve relatively small variation in the individual throat areas and in the desired total throat area.

In one typical gas turbine engine design, it is desirable to maintain the individual and total throat areas to within about $\pm\frac{1}{4}\%$. However, using conventional manufacturing methods, it is not believed that this small tolerance is achievable. In order to appreciate the smallness of this tolerance and the difficulty in obtaining it, examination of a particular method of manufacturing a turbine nozzle will be helpful.

More specifically, one conventional method of manufacturing a turbine nozzle includes a conventionally known leading edge nest for fixturing individual vanes in space during manufacture for obtaining the required throat area. It is known that to fully locate in space a three-dimensional object, such as a nozzle vane, requires six point supports for preventing translation along the three axes of a three axis orthogonal coordinate system (e.g. X, Y, and Z axes) and for preventing rotation about each of the three axes. Accordingly, conventional fixturing devices are used for predeterminedly locating individual nozzle vanes in space relative to a reference datum so that when adjacent vanes are assembled together they are predeterminedly located relative to each other for providing among other things the required throat area therebetween.

In the leading edge nest, a nozzle vane is fixtured, or supported at six points relative to the datum during the manufacturing process. The leading edge nest includes a first pair of radially spaced leading edge supports for opposing yaw of the vane relative to, for example, the chord of the vane. A second pair of radially spaced midchord supports contact the suction side of the vane between the leading and trailing edges thereof for opposing roll of the vane relative to the chord. A radial support radially locates the vane. And, an aft support contacts the suction side of the vane adjacent to the trailing edge for opposing pitch of the vane relative to the radial axis thereof. The six supports also oppose translation of the vane in all three axes. The vane is typically held against or restrained against the six supports by conventional means including spring clamps, such as those used to position hardware during welding, and set screws as appropriate to react machining forces. The leading edge nest provided by the fixturing device, therefore, predeterminedly positions the vane in space relative to the datum and, relative to adjacent ones of the vanes.

Once the vane is fixtured, then the integral bands of the first method may be conventionally machined relative thereto, or the bands including the apertures of the second method may be spot welded and then brazed thereto, or in the third method, the bands may be cast to the vanes.

After a turbine nozzle has been conventionally manufactured, the individual throat areas between adjacent ones of the vanes are measured for determining the uniformity thereof. If the individual throat areas do not meet applicable specifications, they may be conventionally benched, wherein the trailing edges thereof are permanently abrasively ground away in order to adjust the individual throat areas. In this way, excessive stack-up tolerances which result in unacceptable variation in throat areas between adjacent vanes may be accommodated after the initial manufacturing of the turbine nozzle. However, benching is only effective for correcting a certain small amount of deviation in throat area, and is generally ineffective for correcting the total throat area of all the nozzle vanes. Furthermore, in nozzle vanes conventionally coated for improved nozzle life, benching is not possible since the coatings are typically thin and their effectiveness would be unacceptably damaged.

The leading edge nest ensures that the leading edges of adjacent vanes are aligned in a common plane and that the vanes extend in an aft direction therefrom for providing the predetermined converging nozzle between adjacent ones of the vanes ending in the desired throat, and throat area thereof. However, the accuracy of the throat area is a function of the accuracy of the tolerances of the vanes and the assembly thereof. For example, the thickness of an individual vane has a first tolerance, and, if the vanes are conventionally coated on both sides, each of the coatings has a second tolerance. Accordingly, the accuracy of the throat area is directly related to the stack-up of these two tolerances since the leading edge nest uses the aft support on the suction side of the blade and the throat is defined on the pressure side of the blade between the trailing edge and an adjacent vane. In this example, the initial vane casting may have a first tolerance of 5 mils (0.13 mm) on each side thereof, and a conventional coating on each side of the blade may have a second tolerance of 5 mils (0.13 mm) resulting in a total tolerance stack-up of about 20 mils (0.51 mm) for both sides. An exemplary throat area required between adjacent vanes may be defined in part by the distance between the blades of about 0.555 inches (14.1 mm). A ¼% tolerance on the throat area would then be about 2.75 mils (0.07 mm). Dividing the 20 mils (0.51 mm) tolerance stack-up by the desired tolerance of 2.75 mils (0.07 mm) results in about a 700% potential error. If the nozzle is fabricated by the second or third method described above, additional stack-up and error will be added to the above error.

OBJECTS OF THE INVENTION

Accordingly, it is one object of the present invention to provide a new and improved method of manufacturing a gas turbine engine turbine nozzle.

Another object of the present invention is to provide a method of manufacturing a turbine nozzle for reducing stack-up tolerances.

Another object of the present invention is to provide a method of manufacturing a turbine nozzle for reducing stack-up tolerances at a nozzle throat defined between adjacent ones of nozzle vanes.

Another object of the present invention is to provide a method of manufacturing a turbine nozzle for obtaining a predetermined value of throat area between adjacent ones of the nozzle vanes.

Another object of the present invention is to provide a method of manufacturing a turbine nozzle which provides improved uniformity in throat areas between adjacent ones of nozzle vanes.

Another object of the present invention is to provide new and improved turbine nozzles manufactured by the improved manufacturing method.

DISCLOSURE OF INVENTION

A method of manufacturing a turbine nozzle for obtaining a predetermined value of throat area between adjacent ones of nozzle vanes is disclosed. The method includes providing a first vane, providing a datum for locating the first vane relative to an adjacent vane in the turbine nozzle, and fixturing the first vane relative to the datum for providing a trailing edge nest having six supports for predeterminedly locating the first vane relative to the adjacent vane. The trailing edge nest includes four trailing edge supports for locating the vane trailing edge to define a hinge axis extending along the trailing edge about which the vane is rotatable. A radial support radially locates the vane, and a throat support predeterminedly locates the vane about the hinge axis for obtaining the predetermined value of the throat area. The turbine nozzle manufactured using this method has reduced throat stack-up tolerances.

BRIEF DESCRIPTION OF DRAWINGS

The novel features believed characteristic of the invention are set forth and differentiated in the claims. The invention, in accordance with preferred and exemplary embodiments, together with further objects and advantages thereof is more particularly described in the following detailed description taken in conjunction with the accompanying drawing in which:

MODE(S) FOR CARRYING OUT THE INVENTION

Figure 1:
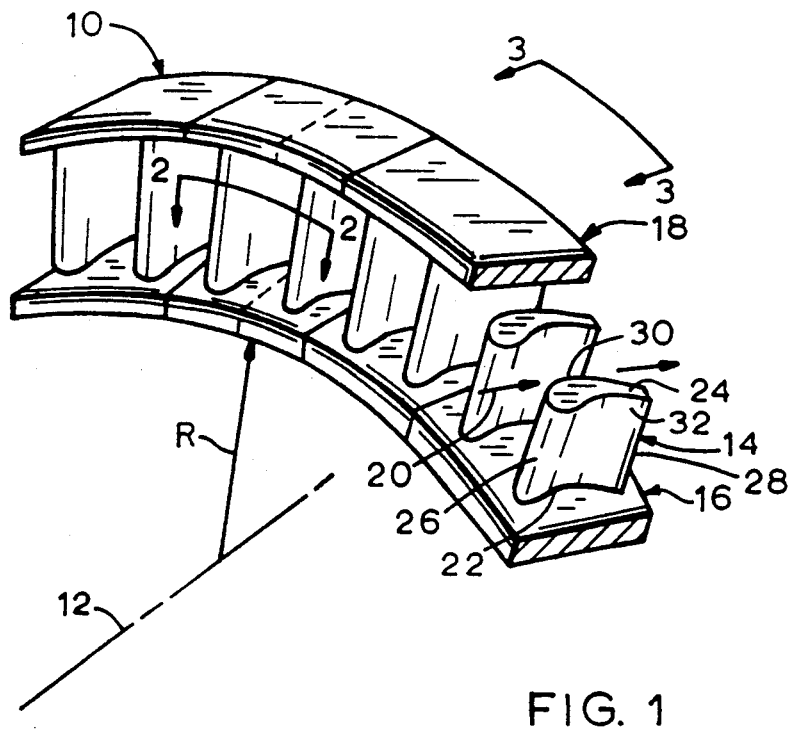
FIG. 1 is a perspective view of an arcuate section of an annular gas turbine engine turbine nozzle.

Illustrated in FIG. 1 is a portion of an annular, 360° turbine nozzle or diaphragm 10 disposed coaxially about a longitudinal, or axial, centerline 12 of a gas turbine engine. The nozzle 10 includes a plurality of circumferentially spaced nozzle vanes 14 fixedly joined to radially inner and outer annular bands 16 and 18, respectively. The inner band 16 has an inner radius R relative to the centerline axis 12 for conventionally positioning the vanes 14 in line with combustion gases 20 channeled thereto from a conventional gas turbine engine combustor (not shown). The turbine nozzle 10 may be any turbine nozzle including the conventionally known high pressure turbine nozzle disposed at the outlet of the combustor, or it may be a turbine nozzle disposed at a downstream stage of the turbine.

Each vane 14 includes a root 22 conventionally fixedly joined to the inner band 16, a tip 24 conventionally fixedly joined to the outer band 18, a leading edge 26 facing in an upstream direction, a trailing edge 28 facing in a downstream direction, and oppositely facing suction, or convex, and pressure, or concave, sides 30 and 32, respectively, extending from the leading edge 26 to the trailing edge 28 and between the root 22 and the tip 24.

Figure 2:
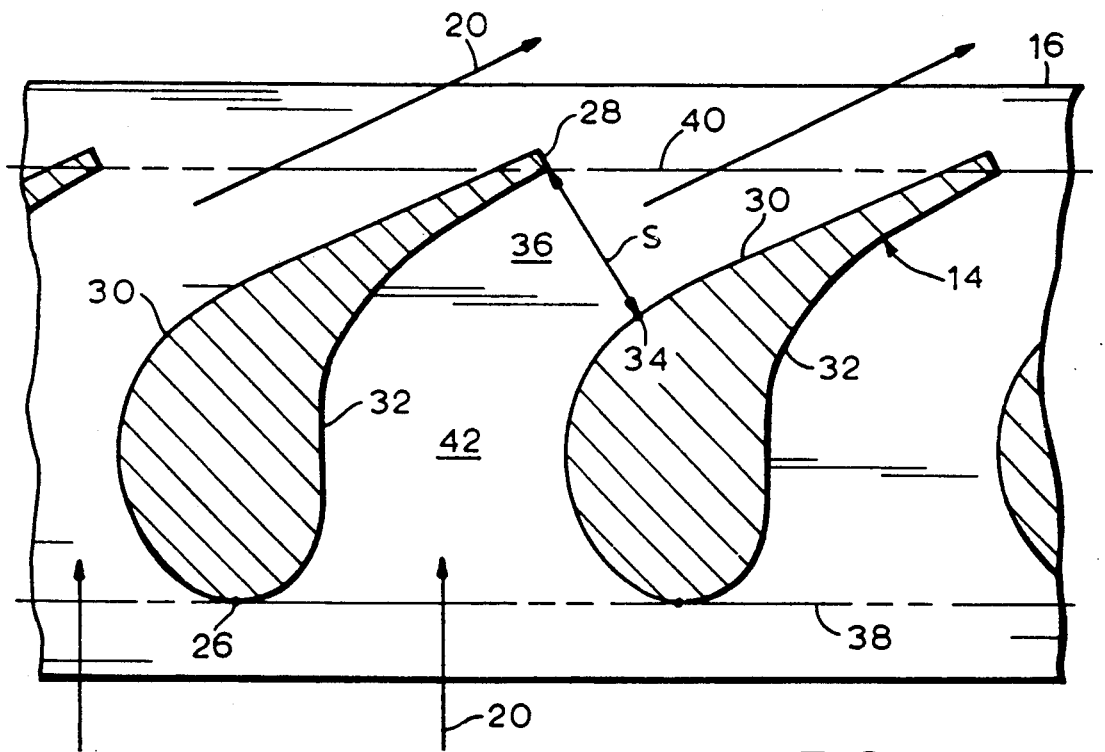
FIG. 2 is a circumferential sectional view of the turbine nozzle illustrated in FIG. 1 taken along line 2—2.
Figure 3:
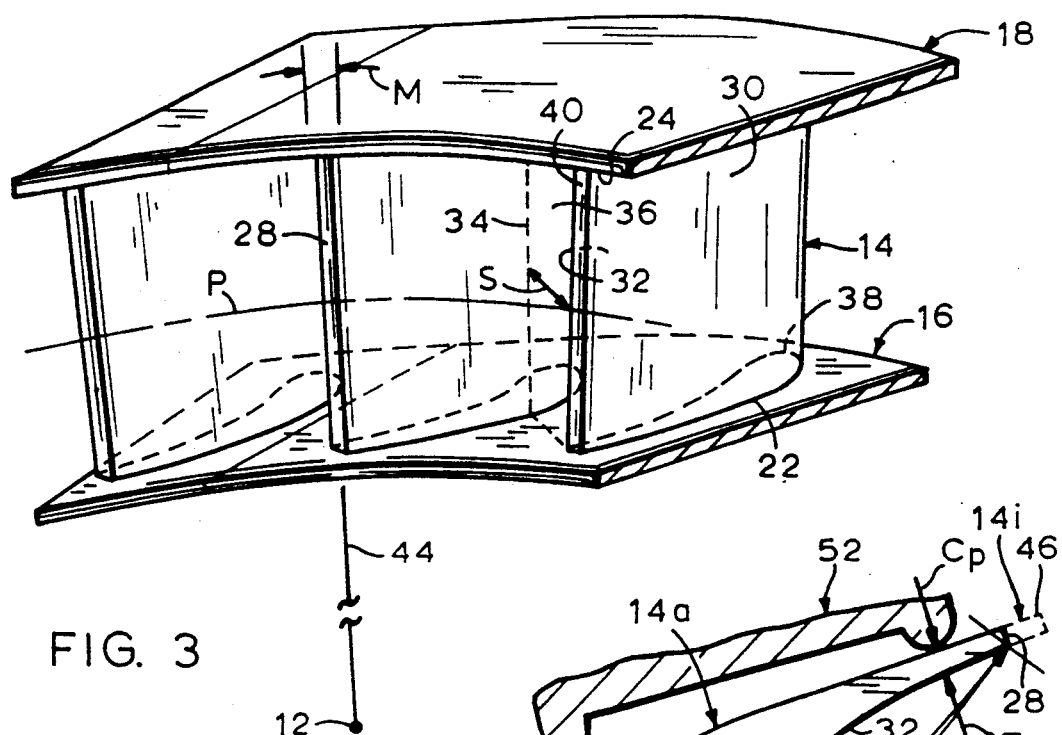
FIG. 3 is a perspective upstream facing view of a portion of the turbine nozzle illustrated in FIG. 1 taken along line 3—3.

As illustrated in FIGS. 2 and 3, each of the vanes 14 includes a throat line 34 extending from the root 22 to the tip 24 on the vane suction side 30 for defining with the trailing edge 28 of an adjacent one of the vanes 14 a throat 36 of minimum throat area A. All of the leading edges 26 of the vanes 14 are preferably located in a common leading edge plane 38, and similarly, all of the vane trailing edges 28 are also located in a common trailing edge plane 40. Adjacent ones of the vanes 14 define therebetween a converging channel 42 for channeling the combustion gases 20 between the vane 14 and through the throats 36 and downstream therefrom to a conventional turbine rotor stage (not shown).

As illustrated in FIG. 3, each of the vanes 14 extends generally parallel to a radial axis 44 extending outwardly from the centerline axis 12. However, the trailing edge 40 may be inclined at an angle M relative to the radial axis 44. Each of the throats 36 extends from the vane root 22 to the vane tip 24 and the throat area A is defined as that planar area between the root 22, tip 24, pressure side 32 at the trailing edge 28, and the throat line 34 on the suction side 30 of an adjacent vane 14. The throat area A is therefore directly related to the heights of the vane 14 at the trailing edge 28 and the throat line 34, and the circumferential spacing S between the pressure side 32 at the trailing edge 28 and the suction side 30 of an adjacent vane at the throat line 34. An exemplary spacing S between the vanes 14 occurs at the vane pitch line P disposed radially equidistantly between the vane root 22 and tip 24.

In accordance with the present invention, an improved method of manufacturing the turbine nozzle 10 for obtaining a predetermined value of the throat area A is provided. The method is effective for reducing stack-up tolerances during the manufacture of the nozzle 10 from the plurality of vanes 14 and, therefore, for improving the uniformity of the individual throat areas A of the throats 36, as well as providing an improved total throat area of the individual throat areas A collectively.

Figure 4:
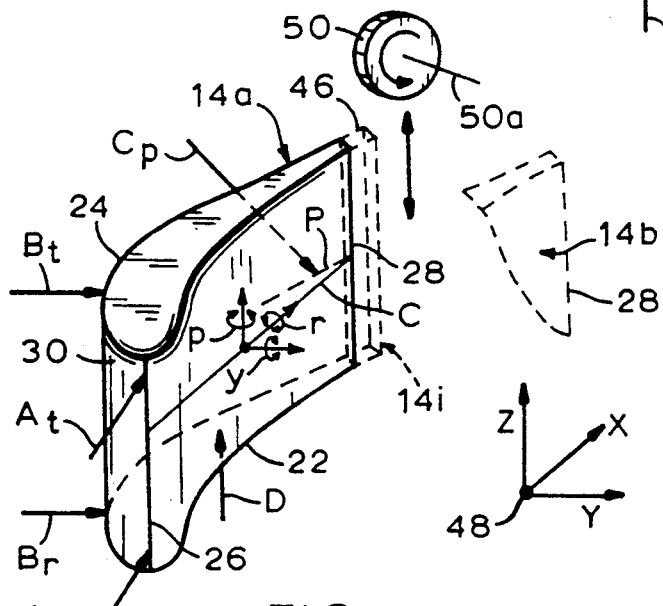
FIG. 4 is a schematic representation of a nozzle vane fixtured using a leading edge nest for undergoing precision grinding.

The method preferably includes the step of providing a first one of the vanes 14, designated 14a as illustrated in FIG. 4, which has a chord C having a predetermined chord length L between the leading edge 26 and the trailing edge 28. Although in the preferred embodiment, the chord C is that chord at the pitch line P, the chord at other radial sections of the blade 14 may also be used. All of the vanes 14, including the first vane 14a, may be conventionally manufactured to required specifications for particular engines for providing the required finally dimensioned, or final blade contour including the suction and pressure sides 30 and 32 and the predetermined chord lengths, e.g. L, for ensuring an accurate channel 42 between adjacent vanes 14 after manufacture or assembly in accordance with the present invention.

In one embodiment of the present invention, the first vane 14a may be provided by providing an initial vane 14i as illustrated in FIG. 4 which is identical to the first vane 14a except for including a trailing edge extension 46 (shown in dashed line) which is about 30 mils (0.76 mm) longer than the required length of the first vane 14a. The method also includes fixturing the initial vane 14i as illustrated schematically in FIG. 4 relative to a datum 48 for providing a first, or leading edge nest having six point supports for predeterminedly locating the initial vane 14i in space relative to the datum 48 and an adjacent vane 14b (trailing edge portion shown in dashed line). The leading edge nest is conventional and provides the six point supports for locating the initial vane 14i in space. The initial vane 14i is conventionally restrained against the six supports by conventional means including welding spring clamps and/or adjustable set screws in accordance with conventional practice.

As illustrated in FIG. 4, the datum 48 is a conventional three axis (X, Y, and Z axes) coordinate system used for locating the initial vane 14i in space so that it may be machined by conventional machines such as a precision grinder represented schematically by the grinding wheel 50. The grinding wheel 50 conventionally rotates about its longitudinal axis 50a and is conventionally translatable along the trailing edge extension 46 for the precise removal thereof.

The leading edge nest conventionally includes a first pair of radially spaced leading edge supports shown schematically as arrows $A_t$ and $A_r$ which contact the leading edge 26 of the initial vane 14i for opposing or preventing yaw of the initial vane 14i. One of the leading edge supports, $A_t$, is preferably spaced adjacent to the tip 24 of the vane 14i and the other of the leading edge supports, $A_r$, is preferably positioned adjacent to the root 22 of the vane 14i. The two leading edge supports $A_t$ and $A_r$ prevent yaw of the initial vane 14i which is defined as rotation of the vane 14i about an axis perpendicular to the chord C and shown schematically as yaw angle y in FIG. 4.

A second pair of radially spaced midchord supports $B_t$ and $B_r$ contact the suction side 30 of the initial vane 14i between the leading and trailing edges thereof for opposing or preventing roll of the initial vane 14i. Roll is defined as rotation of the vane 14i generally about the chord C and is represented schematically by the roll angle r in FIG. 5.

An aft support represented schematically by the arrow $C_p$ contacts the initial vane 14i suction side 30 adjacent to the trailing edge 28, and preferably at the pitch line P for opposing or preventing pitch of the initial vane 14i. Pitch is rotation of the vane 14i generally about its radial axis 44 (i.e. axis perpendicular to both the yaw and roll axes) and is shown schematically as p is FIG. 4.

Of course, the leading edge supports, the midchord supports, and the aft support also effectively oppose translation of the initial vane 14$i$, and along with a radial support designated by the arrow D, completely locate the vane 14$i$ in space. The radial support D radially locates the initial vane 14$i$ by supporting it, for example, at the root 22.

With the initial vane 14$i$ conventionally fixtured in space relative to the datum 48, the trailing edge extension 46 may be precisely removed by the grinding wheel 50 in accordance with conventional practice for providing the first vane 14$a$ having the predetermined chord lengths between the leading edge 26 and the trailing edge 28. In the preferred embodiment of the invention, the grinding wheel 50 removes the trailing edge extension 46 for providing a substantially square-ended trailing edge 28 as shown, for example, in FIGS. 4 and 5.

The datum 48 may conventionally be one or more datums for ensuring that the initial vane 14$i$ is suitably fixtured, and the trailing edge extension 46 is suitably removed for providing the first vane 14$a$ having the required final chord length dimensions before assembly into the turbine nozzle 10. Each of the vanes 14 may be similarly manufactured so that all of the vanes 14 are ready for final assembly into the turbine nozzle 10. In any embodiment of the invention wherein the vanes 14 are to be coated with conventional coatings, they are then applied at this time for providing the finally dimensioned vanes 14. Of course, any additional thickness of the vane 14 due to the coatings thereof, is suitably accounted for in the initial dimensions of the vane 14.

Figure 5:
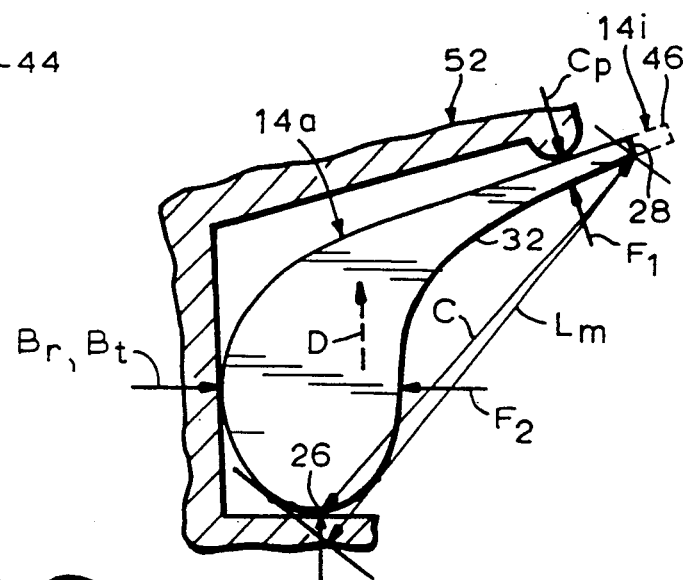
FIG. 5 is a radial sectional view of an exemplary nozzle vane restrained in a fixturing device.

The leading edge nest may be provided by a conventional fixture 52, a portion of which is illustrated in FIG. 5. The fixture 52 provides all six support points $A_r$, $A_t$, $B_r$, $B_t$, $C_p$, and D. Two of several restraints designated schematically by arrows $F_1$ and $F_2$ are shown for restraining the initial vane 14$i$ against the six supports to ensure that the initial vane 14$i$ is rigidly captured for undergoing the grinding operation. The length of chord C may be measured during the grinding operation by any conventional means to ensure that the predetermined values thereof are obtained from the root 22 to the tip 24 of the initial vane 14$i$. However, as illustrated in FIG. 5, the length of chord C may be accurately determined by measuring an alternate chord length $L_m$ defined between the vane pressure side 32 at the trailing edge 28 and a line contacting the initial vane 14$i$ adjacent to the leading edge 26 which line is disposed perpendicularly to the line of length $L_m$ which also contacts the initial vane 14$i$ adjacent to the leading edge 26. Measurement of the length $L_m$ is preferred since it is readily obtainable by placing straight edges against the surfaces of the initial vane 14$i$. Of course, other conventional techniques for accurately measuring the length of chord C may be utilized.

Providing the first vane 14$a$ with accurate, i.e. to design specifications, chord lengths ensures proper alignment between the respective leading edges 26 and respective trailing edges 28 as described further hereinbelow. Providing the square-ended trailing edges 28 improves the accuracy of obtaining accurate, i.e. to design specifications, throat areas A. The first vane 14$a$ may also be provided with a conventional coating after the trailing edge extension 46 is removed, if desired, and prior to the additional steps described below.

Figure 6:
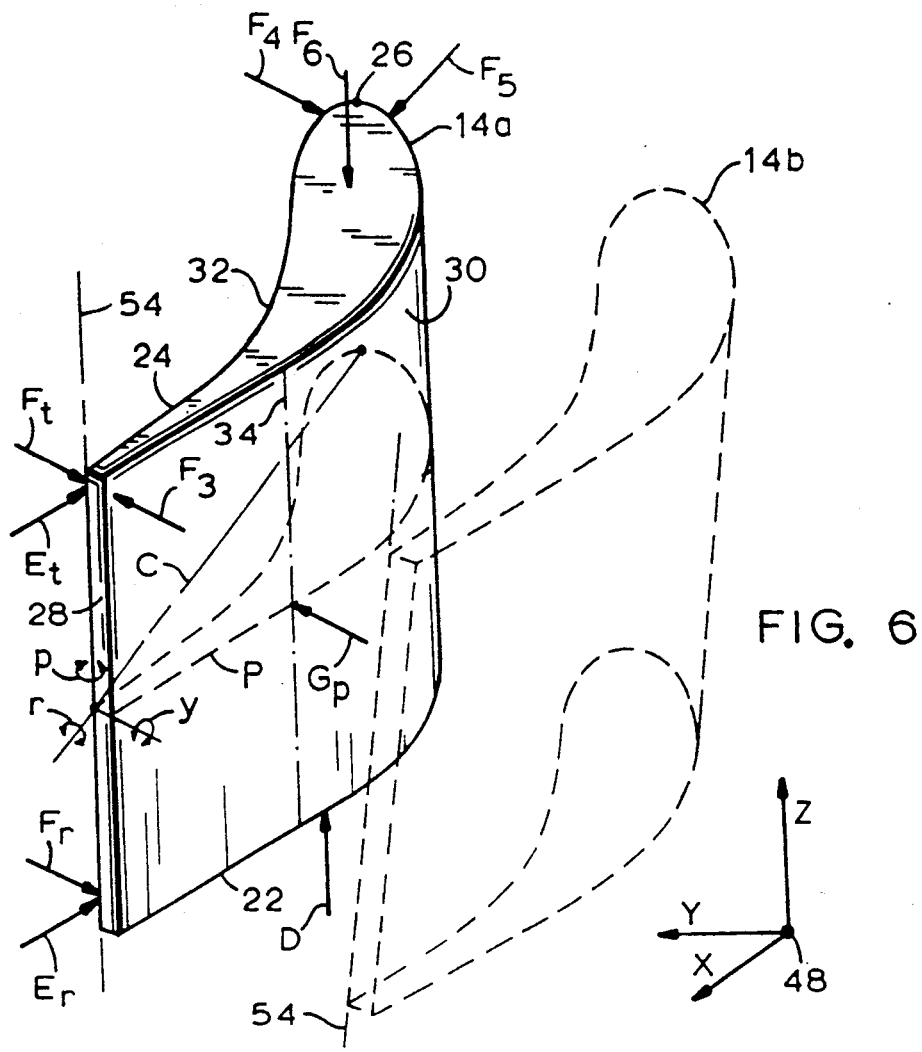
FIG. 6 is a schematic representation of fixturing a nozzle vane using a trailing edge nest.
Figure 7:
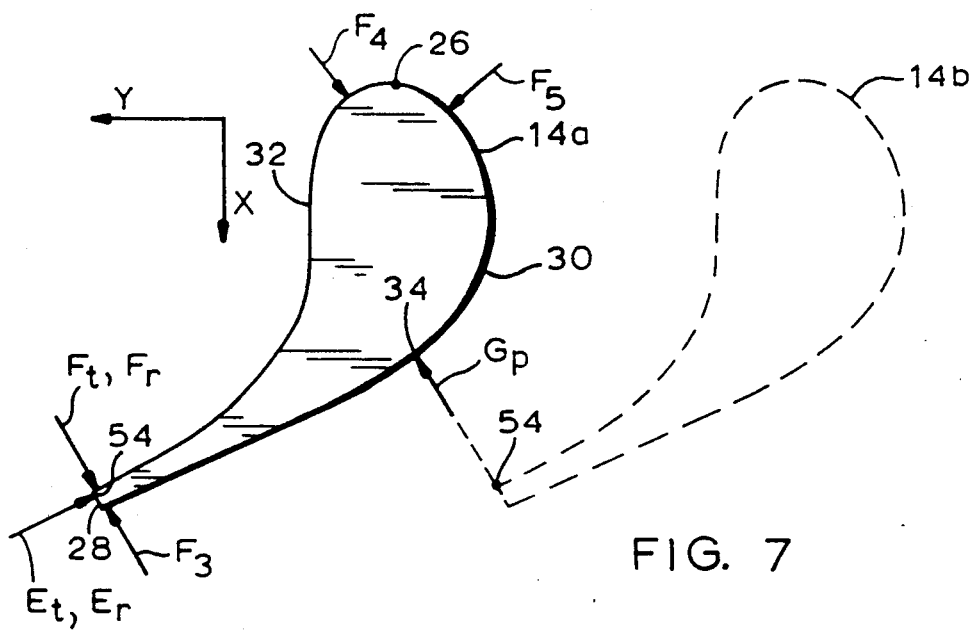
FIG. 7 is a radial top view of the nozzle vanes illustrated in FIG. 6 showing the trailing edge nest.

As illustrated in FIGS. 6 and 7, each of the vanes 14 which form the turbine nozzle 10 is provided in turn as the first vane 14$a$ for being suitably fixtured in accordance with another feature of the present invention. The reference datum 48 is again provided for locating the first vane 14$a$ relative to the adjacent vane 14$b$ (shown in dashed line). In contrast to the conventional fixturing step illustrated in FIGS. 4 and 5 wherein the initial vane 14$i$ was fixtured for providing the leading edge nest ($A_r$, $A_t$, $B_r$, $B_t$, $C_p$, and D) the method includes fixturing the first vane 14$a$ relative to the datum 48 for providing a trailing edge nest having six point supports for predeterminedly locating in space the first vane 14$a$ relative to the adjacent vane 14$b$.

The trailing edge nest includes four trailing edge supports $E_t$, $E_r$, $F_t$, and $F_r$, which define a hinge axis 54 extending along the trailing edge 28 about which hinge axis 54 the first vane 14$a$ is rotatable like a door. Of course, various orientations and configurations of the trailing edge 28 may be used depending upon particular nozzle designs. The trailing edge 28 may be disposed radially to the centerline axis 12, or at the small angle M relative thereto as shown in FIG. 3, and may be straight or bowed. In all cases, however, the hinge axis 54 may still be defined for allowing the vane 14$a$ to pivot like a door.

The trailing edge nest also includes a radial support, which may be the same as the radial support D disclosed above, for radially locating the first vane 14$a$ relative to the datum 48, and a throat support $G_p$ for predeterminedly locating the first vane 14$a$ about the hinge axis 54 for obtaining the predetermined value of the throat area A. Just as with the leading edge nest described above, the trailing edge nest supports $E_t$, $E_r$, $F_t$, $F_r$, D, and $G_p$ are also shown as arrows indicating the supports and where they preferably contact the first vane 14$a$ for supporting the first vane 14$a$. The first vane 14$a$ is also conventionally restrained against the six supports by conventional spring clamps, and/or set screws which are shown schematically in FIG. 6 by the arrows labeled $F_3$, $F_4$, $F_5$ and $F_6$ near the leading and trailing edges 26 and 28 of the first vane 14$a$.

The trailing edge supports preferably include a first pair of radially spaced trailing edge supports $E_t$ and $E_r$ for opposing yaw of the first vane 14$a$, and a second pair of radially spaced supports $F_t$, and $F_r$ for opposing roll of the first vane 14$a$. The throat support $G_p$ opposes pitch of the first vane 14$a$ about the hinge axis 54. As described above, yaw is the rotation of the first vane 14$a$ about an axis generally perpendicularly to the chord C and designated as yaw angle y in FIG. 6, roll is rotation of the first vane 14$a$ about the chord C at the pitch line P and designated as roll angle r, and pitch is rotation of the first vane 14$a$ about the hinge axis 54 and designated as pitch angle p. With the first vane 14$a$ suitably restrained against the six supports, yaw, roll, pitch, and translation along the three axes are all prevented and the first vane 14$a$ is, therefore, suitably positioned in space relative to the datum 48.

A significant feature of the present invention is the trailing edge nest which allows the first vane 14$a$ to be rotated during assembly about the hinge axis 54 as illustrated in FIG. 7. During fixturing of the first vane 14$a$, the vane trailing edge 28 is positioned against the four trailing edge supports $E_t$, $E_r$, $F_t$, and $F_r$ and then the first vane 14$a$ is rotated (pitch) about the hinge axis 54 until it contacts the aft support $G_p$, while being supported by the radial support D. In this way, the first vane 14$a$ may be more directly fixtured for reducing manufacturing tolerance stack-up between the first vane 14a and the adjacent vane 14b to which it will be assembled for reducing inaccuracies in the throat area A.

As illustrated in FIGS. 6 and 7, the throat support $G_p$ preferably contacts the first vane suction side 30 at the throat line 34 and the second pair of trailing edge supports $F_t$, $F_r$ contact the first vane pressure side 32 at the trailing edge 28. The first pair of trailing edge supports preferably include a trailing edge support $E_t$ disposed adjacent to the vane tip 24 and a trailing edge support $E_r$ disposed adjacent to the vane root 22. The second pair of trailing edge supports preferably include a trailing edge support $F_t$ disposed adjacent to the vane tip 24 and a trailing edge support $F_r$ disposed adjacent to the vane root 22. Since the first vane 14a is rotatable about the hinge axis 54, its pitch angular position may be determined by locating the throat support $G_p$ at any point along the radial extent of the first vane 14a. For example, the throat support $G_p$ may contact the throat line 34 at the pitch line P since the hinge axis 54 is typically disposed parallel to a radial axis (axis 44 as shown in FIG. 3) in the assembled turbine nozzle 10, and the pitch line P provides an average location for positioning the first vane 14a.

Since the pressure side 32 at the trailing edge 28 of one vane defines the throat 36 with the throat line 34 on the suction side 30 of the adjacent vane 14b, by fixturing the first vane 14a on the pressure side 32 at the trailing edge 28 ($F_t$, $F_r$) and on the suction side 30 at the throat line 34 ($G_p$) stack-up tolerances therebetween are eliminated. In this feature of the present invention, the first vane 14a is fixtured relative to an adjacent vane 14b (i.e. relative to the required location of the adjacent vane 14b in the assembled nozzle according to the particular design specification or drawing) to ensure that a predetermined value of the throat area A is obtained upon assembly. However, the relative placement of the other portions of the vane 14a away from the throat 36 is still subject to manufacturing tolerances. The predetermined chord length L is preferred to ensure that both the leading edges 26 and trailing edges 28 of adjacent vanes are coplanar, respectively. Any discrepancy in the vanes 14 other than at the throats 36 due to stack-up of manufacturing tolerances is considered secondary to the accuracy of the throats 36.

Figure 8:
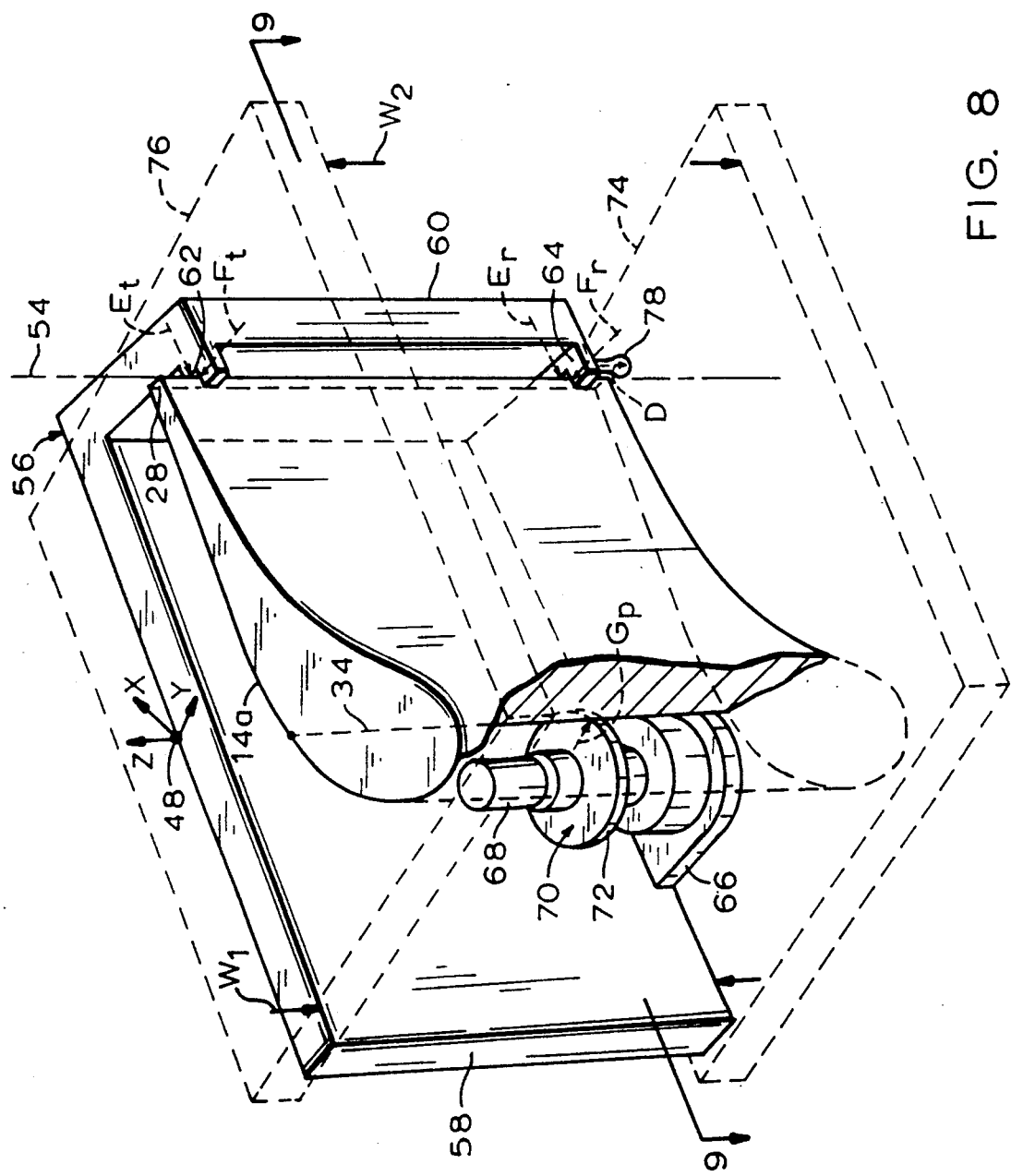
FIG. 8 is a perspective schematic representation of a fixturing device for fixturing a nozzle vane using a trailing edge nest as illustrated in FIGS. 6 and 7.
Figure 9:
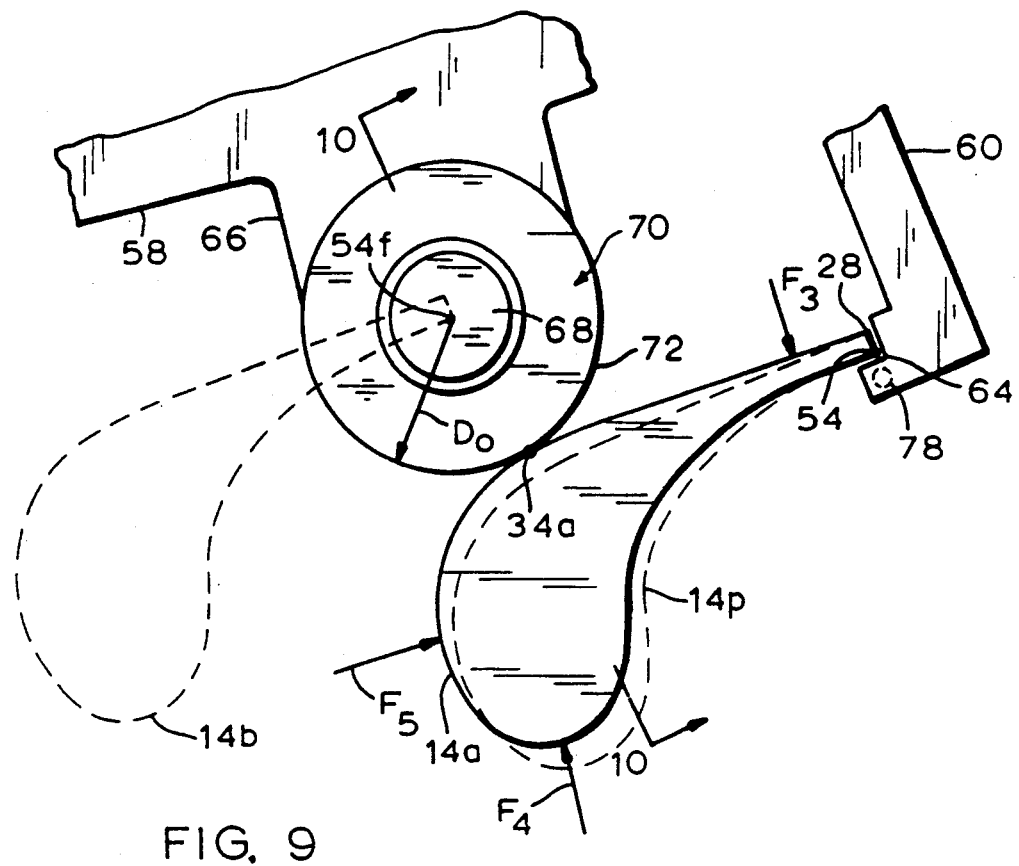
FIG. 9 is a top view of the nozzle vane and fixturing device illustrated in FIG. 8 taken along line 9—9.
Figure 10:
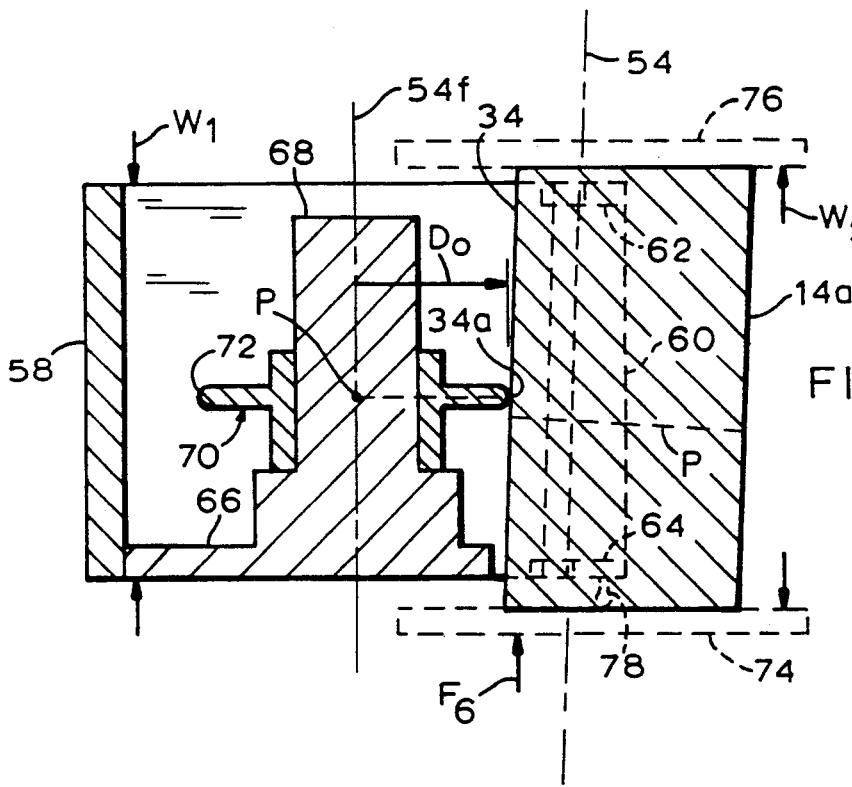
FIG. 10 is a transverse sectional view of the nozzle vane and fixturing device illustrated in FIG. 9 taken along line 10—10.

Illustrated in FIGS. 8–10 is an exemplary fixture 56 which is effective for providing the trailing edge nest illustrated in FIGS. 6 and 7, and allows for conventional measurement and verification of the throat area A. Of course, any conventional fixture may be used for fixturing the vanes 14 for providing the trailing edge nest for manufacture and assembly of the turbine nozzle 10. The fixture 56 preferably includes a datum plate 58, which includes the datum 48, with an integral flange 60 extending outwardly therefrom. The flange 60 includes a first inside corner 62 extending therefrom, and a second inside corner 64 extending therefrom and spaced apart from the first inside corner 62. The first and second corners 62 and 64 are complementary to the square-ended trailing edge 28 of the first vane 14a and therefore provide the four trailing edge supports $E_t$, $E_r$, $F_t$, and $F_r$. The first vane 14a, is therefore, allowed to rotate in the first and second corners 62 and 64 about the hinge axis 54.

The throat support $G_p$ preferably includes a base 66 extending outwardly from the datum plate 58 which is predeterminedly located relative to the datum reference 48, and a fixed shaft 68 extends outwardly from the base 66 and generally parallel to the datum plate 58. A preferably removable annular sleeve 70 is slidingly disposed on the shaft 68 and has a predetermined circumference 72 having an outer radius $D_o$. The circumference 72 is predeterminedly positioned on the shaft 68 relative to the datum 48 for contacting the vane throat line 34 for locating the first vane 14a about the hinge axis 54 for obtaining the predetermined value of the throat area A. The sleeve 70 is removable so that it may be replaced with differently sized sleeves 70 for using the fixture 56 for differently sized vanes 14.

As illustrated in FIG. 9, the centerline of the shaft 68 and the sleeve 70 is preferably disposed relative to the datum 48 (i.e. in accordance with the particular design specification or drawing) so that it is coaxial with the required location of the hinge axis 54, designated 54f, of an adjacent vane 14b shown in dashed line in FIG. 9. As illustrated in FIG. 10, the plane of the sleeve circumference 72 is preferably disposed perpendicular to the fixture hinge axis 54f, and preferably at the pitch line P at the trailing edge 28 of the adjacent vane 14b. For example, the radius $D_0$ of the sleeve 70 is preferably equal to the linear distance measured perpendicularly from the hinge axis 54f at the pitch line P of the trailing edge 28 of the adjacent vane 14b to the corresponding point, designated 34a, on the throat line 34 of the first vane 14a which will necessarily be located above the pitch line P of the first vane 14a since the vanes 14 are disposed radially outwardly from the centerline 12. Alternatively, the sleeve 70 may be disposed for contacting the throat line 34 of the first vane 14a at its pitch line P, or any other point along the throat line 34.

As illustrated in FIG. 9, the first vane 14a is initially positioned (as shown in dashed line and designated 14p) in the fixture 56 by positioning the trailing edge 28 into the first and second corners 62 and 64. The first vane 14a is then rotated from the initial position 14p until the throat line 34 contacts the sleeve circumference 72 which prevents further rotation of the first vane 14a. The first vane 14a is thereby predeterminedly positioned in space relative to the datum 48 and relative to the adjacent vane 14b for defining the predetermined throat 36.

Figure 11:
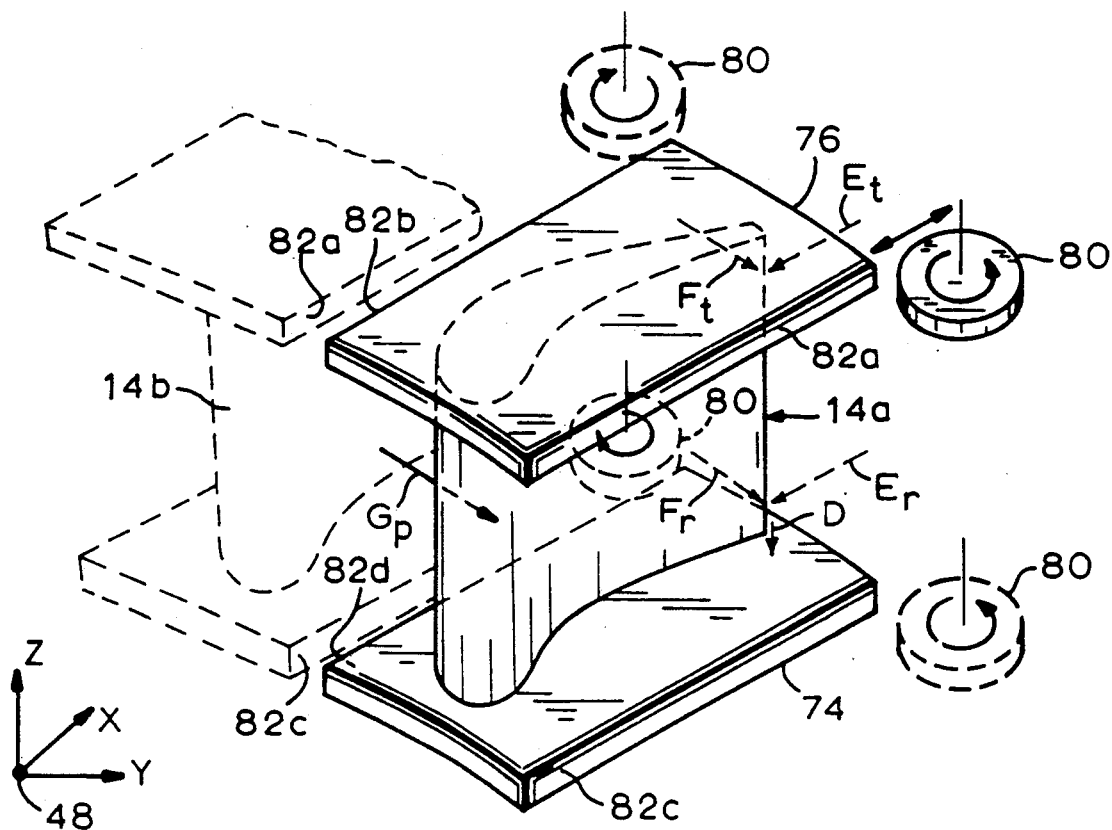
FIG. 11 is a perspective view of a nozzle vane including integral outer and inner band segments fixtured using the trailing edge nest illustrated in FIGS. 6 and 7.

Of course, the particular fixturing device, such as the fixture 56, and the particular six supports $E_t$, $E_r$, $F_t$, $F_4$, D, and $G_p$ are determined based on the particular method of assembling and manufacturing the turbine nozzle 10. FIGS. 8–9 show a particular fixture, i.e., fixture 56, which is effective for fixturing the first vane 14a for use in manufacturing the turbine nozzle 10 from a plurality of vanes 14 having integral, cast inner and outer band segments 74 and 76, respectively as illustrated in FIG. 11. The inner and outer band segments 74 and 76 are also shown in dashed line in FIGS. 8 and 10.

As illustrated in FIGS. 8 and 10, the fixture 56 has a width $W_1$ which is predeterminedly less than the spacing between the inner and outer band segments 74 and 76 and designated $W_2$. This allows the fixture 56 to be positioned between the inner and outer band segments 74 and 76. In this embodiment of the fixture 56, the radial support D is provided by a conventional pin 78 extending from the flange 60 for predeterminedly radially positioning the first vane 14a, including the inner band segment 74, relative to the datum 48. The fixture 56 may be then suitably restrained against the vane 14a and the inner band segment 74 by the conventional restraints $F_3$, $F_4$, $F_5$, and the additional radial restraint $F_6$, as illustrated in FIG. 10, which may also be a suitable spring clamp.

The assembly of the fixture 56 and the first vane 14a including the integral inner and outer band segments 74 and 76 is then conventionally secured to a conventional machine 80, such as a precision grinding machine represented schematically by the grinding wheel designated 80 in FIG. 11. In FIG. 11, the fixture 56 itself is not disclosed for clarity, but instead, the datum 48 is shown to indicate that the first vane 14a and its integral inner and outer band segments 74 and 76 are predeterminedly supported in the grinder 80 for conventional grinding. In this embodiment of the invention, the turbine nozzle 10 illustrated in FIG. 1 is formed of a plurality of the vanes 14 including the inner and outer band segments 74 and 76, which collectively form the inner and outer bands 16 and 18, respectively.

Figure 12:
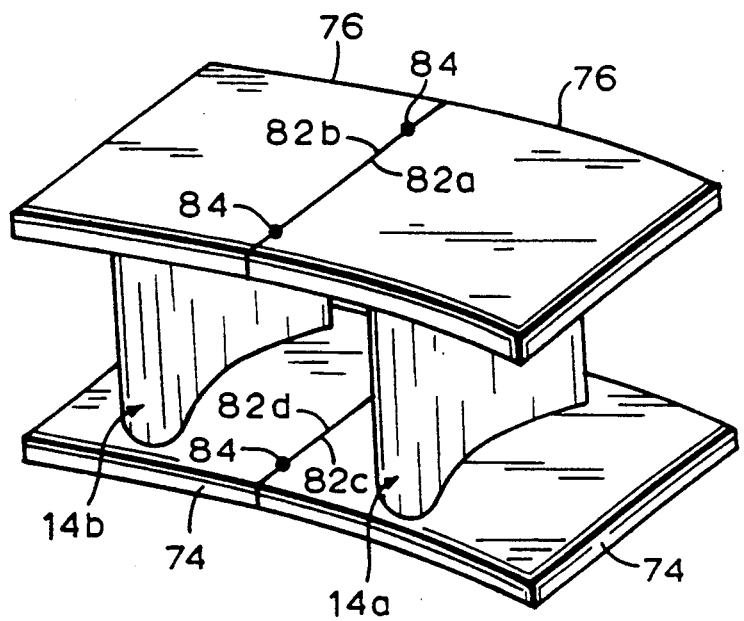
FIG. 12 is a perspective of two of the nozzle vanes illustrated in FIG. 11 joined to each other at the outer and inner band segments.

As shown in FIG. 11, each of the inner and outer band segments includes oppositely facing circumferential faces 82a, 82b, 82c and 82d. The method further includes the step of predeterminedly forming, for example by grinding with the grinder 80 at least one of the inner and outer band segment circumferential faces 82a, 82b, 82c, and 82d relative to the datum 48 and the fixtured first vane 14a for obtaining the predetermined value of the throat area A when the first vane 14a is joined to the adjacent vane 14b by the respective band segments 74 and 76. By conventionally grinding the faces 82b and 82d of the band segments of the first vane 14a, and similarly grinding the faces 82a and 82c of the adjacent vane 14b then upon joining of adjacent ones of the vanes 14 during assembly as illustrated in FIG. 12, the adjacent ones of the vanes 14 will then be predeterminedly spaced relative to each other for ensuring the predetermined value of the throat area A therebetween. The first vane 14a is conventionally fixtured adjacent to the second vane 14b for joining the first vane 14a to the adjacent vane 14b at the inner and outer band segments 74 and 76. The band segments 74 and 76 are initially tack-welded at tack-welds 84 and then preferably brazed along the joining line of the faces 82a and 82b, and along 82c and 82d.

For the vanes 14 illustrated in FIG. 11 with integral inner and outer band segments 74 and 76, the conventional method of manufacturing the turbine nozzle 10 includes the use of the leading edge nest illustrated in FIG. 4 for conventionally grinding the faces 82a, 82b, 82c and 82d prior to assembly with adjacent ones of the vanes 14. In accordance with the present invention, however, the use of the trailing edge nest, illustrated for example in FIG. 6, results in an improved vane and band segment, as shown in FIG. 11, which when conventionally joined to adjacent vanes and band segments, provides increased accuracy of the throat area A therebetween. Although FIG. 12 illustrates that two adjacent vanes are joined to each other for forming a two vane nozzle segment, additional vanes can be joined thereto for forming three or more nozzle vane segments. The nozzle vane segments including two or more vanes are conventionally joined together for forming a complete 360° ring of nozzle vanes for forming the finished turbine nozzle 10.

As illustrated in FIG. 11, all four band segments faces 82a, 82b, 82c, and 82d may be precision ground using the trailing edge nest, as represented by the four positions of the grinder 80. However, in an alternate embodiment of the present invention, only one of the band segment faces 82a, 82b, 82c, or 82d may be so precision ground using the trailing edge nest, and then, the vane and band segments may be alternatively and conventionally fixed in space relative to the one precision ground circumferential face. The one precision ground circumferential face itself then provides a reference datum from which the other three faces may be conventionally machined, by precision grinding for example, in a conventional manner.

Figure 13:
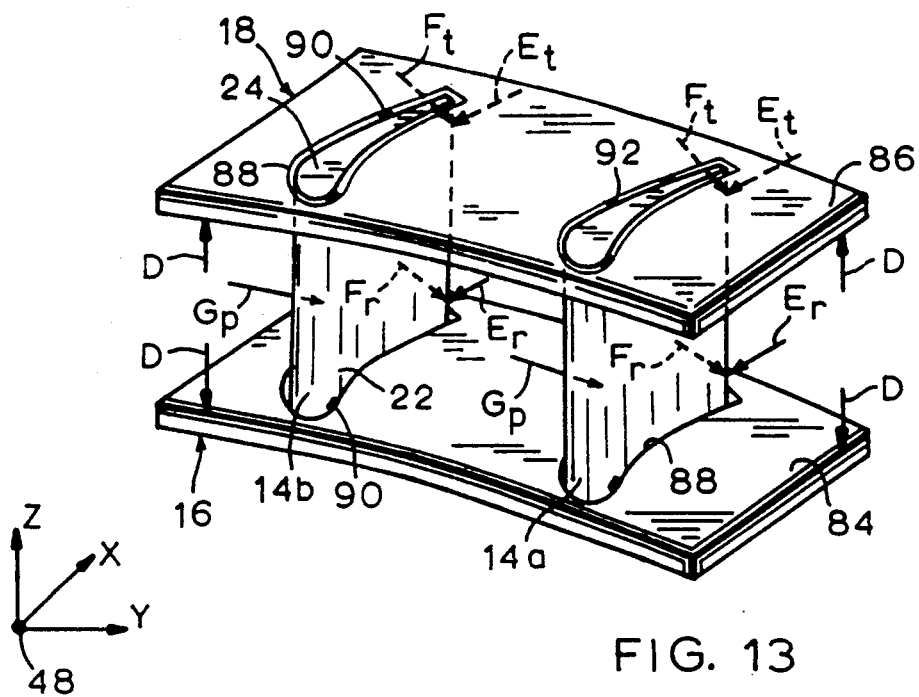
FIG. 13 is a perspective view of an alternate embodiment of the present invention including adjacent nozzle vanes each fixtured using the trailing edge nest illustrated in FIGS. 6 and 7 and joined to inner and outer band segments.

Illustrated in FIG. 13 is an alternate embodiment of the present invention wherein the inner and outer bands 16 and 18 (as illustrated in FIG. 1) each includes a plurality of circumferentially joined inner and outer band segments 84 and 86, respectively. The segments 84, 86 may be either arcuate, or complete 360° rings as desired. Each of the inner and outer band segments 84, 86 includes a plurality of apertures 88 for receiving the vane roots and tips 22, 24, respectively, with the apertures 88 being larger than the roots and tips 22, 24 for allowing the first vane 14a to be fixtured relative to the inner and outer band segments 84, 86 for predeterminedly locating the first vane 14a relative to the adjacent vane 14b. This method of fabricating the turbine nozzle 10 is conventional except for the use of the trailing edge nest disclosed above and illustrated for example in FIG. 6.

In accordance with the present invention, each of the vanes 14, e.g. 14a and 14b, is fixtured relative to the reference datum 48 and the inner and outer band segments 84 and 86 using identical trailing edge nests $E_t$, $E_r$, $F_t$, $F_r$, $G_p$, and D as illustrated in FIG. 13. Any suitable fixturing device may be used for providing the trailing edge nests on the individual vanes 14. In this embodiment of the invention, the radial support D includes two radial supports D for predeterminedly spacing the inner and outer band segments 84 and 86 relative to each other and relative to the vanes 14. Once the vanes 14 are suitably fixtured using the trailing edge nests, the roots 22 and tips 24 may then be tack welded at 90 to the inner and outer band segments 84 and 86 for maintaining their special relationship for providing the predetermined value of the throat area A. The spacing between the roots and tips 22 and 24 and the larger apertures 88 conventionally allows for adjustment of the vane 14 relative to the band segments 84, 86 for obtaining the preferred relationship therebetween, i.e., the predetermined value of the throat area A. As is conventionally done, the remainder of the space between the roots and tips 22 and 24 in the apertures 88 is filled with a conventional braze material 92.

Figure 14:
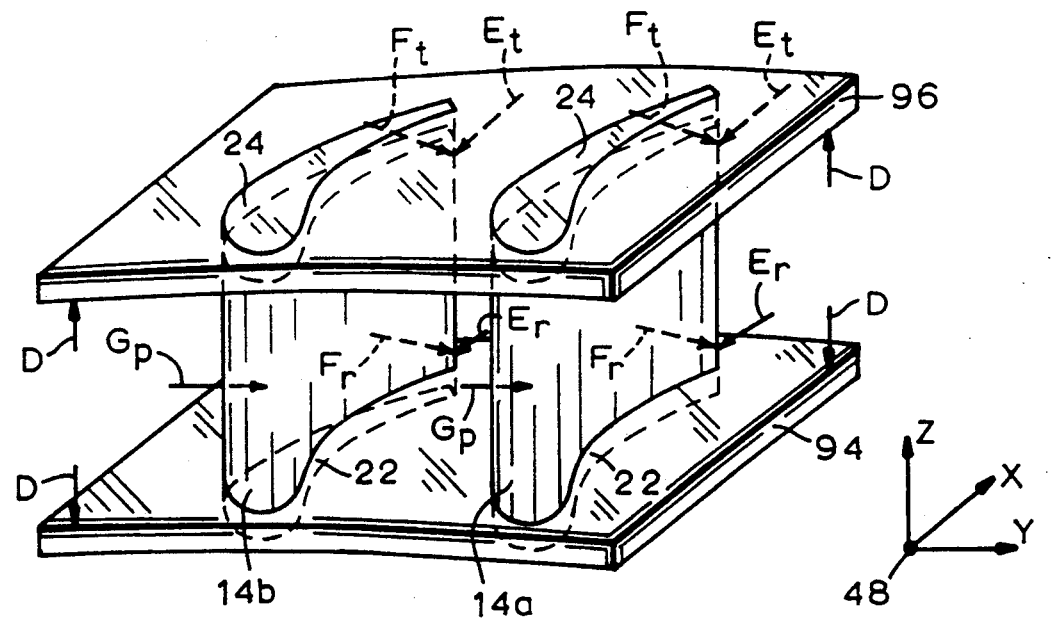
FIG. 14 is another embodiment of the present invention illustrating adjacent nozzle vanes fixtured relative to each other using the trailing edge nest illustrated in FIGS. 6 and 7 and joined to each other by casting of inner and outer band segments.

Illustrated in FIG. 14 is yet another embodiment of the present invention wherein adjacent ones of the vanes 14, i.e., 14a and 14b, are joined together by casting inner and outer band segments 94 and 96 to the roots 22 and tips 24 thereof. This embodiment of the present invention includes fixturing the first vane 14a using the trailing edge nest for locating it relative to the adjacent vane 14b, and then fixturing the adjacent vane 14b using the trailing edge nest, for locating it relative to the first vane 14a. Conventional fixtures may be used for providing the trailing edge nests for locating the first vane 14a relative to the adjacent vane 14b, and then conventional casting of the inner and outer band segments 94 and 96 may be accomplished for fixedly joining the first vane 14a to the adjacent vane 14b for obtaining the predetermined value of the throat area A therebetween. In this embodiment of the present invention, the radial support D includes two radial supports D for accurately positioning the casted inner and outer band segments 94 and 96 relative to the vanes 14.

As is apparent from the teachings provided above, the use of a trailing edge nest instead of the conventional leading edge nest provides an improved manufacturing method for a turbine nozzle for obtaining a predetermined value of the throat area A. The throat 36 can therefore be more accurately formed by reducing manufacturing tolerance stack-up errors as above described. Various conventional fixtures may be utilized for fixturing individual nozzle vanes 14 relative to the reference datum 48 using the trailing edge nest. Conventional forming, or machining, operations may be then used for precisely finally forming the integral inner and outer band segments 74 and 76. And in the embodiments of the invention illustrated in FIGS. 13 and 14, conventional fixtures may be used for obtaining the preferred trailing edge nest of the vanes 14, and then conventional means may be used for joining the bands 84 and 86 to the vanes 14 in the FIG. 13 embodiment, and for casting the bands 94 and 96 to the vanes 14 in the FIG. 14 embodiment.

The method of manufacturing turbine nozzles as described above, therefore, provides improved turbine nozzles 10 having more accurately obtained individual throat areas A by eliminating stack-up tolerances at the throats 36. Since the individual throats have more accurate throat areas A, the total throat areas of all the throats 36 is also more accurate for improving performance of the gas turbine engine.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A turbine nozzle having a plurality of circumferentially spaced vanes fixedly joined to radially outer and inner bands, each vane including a root fixedly joined to said inner band, a tip fixedly joined to said outer band, a leading edge, a trailing edge, suction and pressure sides extending from said leading edge to said trailing edge and between said root and said tip, and a throat line extending from said root to said tip on said suction side for defining a throat area with a trailing edge of an adjacent one of said vanes, said turbine nozzle having a predetermined value of said throat area manufactured by a method comprising:
    providing a first one of said vanes;
    providing a datum for locating said first vane relative to said adjacent vane;
    fixturing said first vane relative to said datum for providing a trailing edge nest having six supports for predeterminedly locating said first vane relative to said adjacent vane, said trailing edge nest including four trailing edge supports for locating said first vane trailing edge to define a hinge axis extending along said trailing edge about which said first vane is rotatable, a radial support for radially locating said first vane, and a throat support for predeterminedly locating said first vane about said hinge axis for obtaining said predetermined value of said throat area; and
    fixedly joining said first vane to said outer and inner bands.

2. A turbine nozzle according to claim 1 wherein:
    said four trailing edge supports include a first pair of radially spaced trailing edge supports for opposing yaw of said first vane, and a second pair of radially spaced supports for opposing roll of said first vane; and
    said throat support opposes pitch of said first vane about said hinge axis.

3. A turbine nozzle according to claim 2 wherein said throat support contacts said vane suction side at said throat line and said second pair of trailing edge supports contact said vane pressure side.

4. A turbine nozzle according to claim 3 wherein:
    said first pair of trailing edge supports include a trailing edge support adjacent to said vane tip and a trailing edge support adjacent to said vane root;
    said second pair of trailing edge supports include a trailing edge support adjacent to said vane tip and a trailing edge support adjacent to said vane root; and
    said throat support contacts said throat line at a pitch line of said vane.

5. A turbine nozzle according to claim 5 wherein said first vane includes a predetermined chord length between said leading edge and said trailing edge and said fixturing step locates said first vane relative to said adjacent vane for aligning said leading edges of said first and adjacent vanes and for aligning said trailing edges of said first and adjacent vanes.

6. A turbine nozzle according to claim 5 wherein said first vane includes a substantially square-ended trailing edge, and said first pair of trailing edge supports contact said trailing edge, and said second pair of trailing edge supports contact said vane pressure side adjacent to said trailing edge.

7. A turbine nozzle according to claim 3 wherein each of said plurality of vanes includes integral outer and inner band segments which collectively form said outer and inner bands, respectively, each of said outer and inner band segments including oppositely facing circumferential faces, and said method further includes forming at least one of said inner and outer band segment circumferential faces of said first vane relative to said datum and said fixtured first vane for obtaining said predetermined value of said throat area when said first vane is joined to said adjacent vane by said respective band segments.

8. A turbine nozzle according to claim 7 wherein all of said circumferential faces of said inner and outer band segments of said first vane are formed relative to said datum and said fixtured first vane.

9. A turbine nozzle according to claim 3 wherein each of said inner and outer bands includes a plurality of circumferentially joined inner and outer band segments, respectively, each of said inner and outer band segments including a plurality of apertures for receiving said vane roots and tips, respectively, said apertures being larger than said roots and tips for allowing said first vane to be fixtured relative to said inner and outer band segments for predeterminedly locating said first vane relative to said adjacent vane, said method for manufacturing said turbine nozzle further including fixedly joining said root and said tip of said first vane to said inner and outer band segments in said apertures.

10. A turbine nozzle according to claim 3 wherein said method further includes:
    fixturing said first vane relative to said adjacent vane;
    fixturing said adjacent vane relative to said datum and first vane for providing said trailing edge nest; and
    casting inner and outer bands to said roots and tips of said first vane and said adjacent vane for fixedly joining said first vane to said adjacent vane for obtaining said predetermined value of said throat area therebetween.

* * * * *